US006605791B2

(12) United States Patent
Grupp

(10) Patent No.: US 6,605,791 B2
(45) Date of Patent: Aug. 12, 2003

(54) PORTABLE ELECTRONIC DEVICE SUCH AS, IN PARTICULAR, A TIMEPIECE, FITTED WITH A PUSH-BUTTON

(75) Inventor: Joachim Grupp, Enges (CH)

(73) Assignee: The Swatch Group Management Services AG (CH)

( * ) Notice: Subject to any disclaimer, the term of this patent is extended or adjusted under 35 U.S.C. 154(b) by 9 days.

(21) Appl. No.: 09/850,070

(22) Filed: May 8, 2001

(65) Prior Publication Data

US 2001/0042680 A1 Nov. 22, 2001

(30) Foreign Application Priority Data

May 11, 2000 (CH) .............................................. 0927/00

(51) Int. Cl.[7] .................................................. H01M 1/10
(52) U.S. Cl. ....................................... 200/512; 368/319
(58) Field of Search ................................ 200/512, 511, 200/61.58 R, 61.59, 293, 333, 302.2; 368/69, 11, 276, 82, 84, 321, 319

(56) References Cited

U.S. PATENT DOCUMENTS 3,973,099 A * 8/1976 Morris, Sr. .............. 200/302.2
4,511,260 A 4/1985 Pasquier
5,339,297 A * 8/1994 Suzuki et al. ............... 368/321
6,000,842 A 12/1999 Muller et al.

FOREIGN PATENT DOCUMENTS

| | | |
|---|---|---|
| EP | 452 254 | 3/1991 |
| EP | 959 393 | 11/1999 |

* cited by examiner

*Primary Examiner*—Elvin Enad
*Assistant Examiner*—M. Fishman
(74) *Attorney, Agent, or Firm*—Sughrue Mion, PLLC

(57) ABSTRACT

The present invention concerns an electronic device such as, in particular, a timepiece (1), including a case (2) made of a plastic material delimited by a back cover (6) and a lateral wall (4) called the middle part, characterised in that this electronic device includes at least one means (36, 38) intended, via the effect of an application of pressure, to control at least one electronic function such as a horological function of said electronic device, this means (36, 38), directed towards the interior of the case (2), being made integral with said case (2) and being set back with respect to the outer surface of the latter, said means (36, 38) being activated using a pointed element such as the tip of a pen.

5 Claims, 2 Drawing Sheets

PORTABLE ELECTRONIC DEVICE SUCH AS, IN PARTICULAR, A TIMEPIECE, FITTED WITH A PUSH-BUTTON

BACKGROUND OF THE INVENTION

The present invention concerns a push-button which is very well suited to use in an electronic watch or in any other electronic device of relatively small dimensions.

As is known, in the field of horology, the case of a watch is an essential element. In the case of electronic watches, the case contains, amongst other things, a battery or a rechargeable accumulator, as well as a quartz oscillator which provides, via a frequency divider circuit, a time base to a control circuit allowing a digital liquid crystal display to be controlled or a stepping motor, able to drive a conventional gear train and a set of hands, to operate. It is thus indispensable for the case to be water resistant and damp proof.

However, push-buttons have to pass through these cases. With a few rare exceptions (touch sensitive keys for example), these push-buttons are, in the current state of the art, indispensable to be able to control the horological functions of a watch necessary, for example, to start a chronograph or reset the time of the watch.

Push-buttons are buttons which project from the middle part of the watch. By pushing them with a finger, the desired watch function is activated. The push-button thus puts the positive pole of the battery or accumulator in contact with the negative pole of the electronic control module which contains, in particular, the time setting programme. Depending on the nature of the pulse, the hands or the time indication provided by the liquid crystal display is moved forward, either minute by minute (short pulse) or by an hour (long pulse). When the pressure ceases, the push-buttons return to their initial place.

The construction of these push-buttons is usually quite complex. They are generally formed of a push-button head which may be driven or bonded onto a push-button stem. The push-button stem is arranged so as to slide inside a housing arranged in the middle part of the watch which has to be made with great precision. The push-button stem moves axially in this housing against the return force of a spring when pressure is applied on the push-button head. The return spring is usually arranged in a housing arranged in the push-button head and rests axially on the bottom of a cavity provided in the middle part. According to a variant, a contact strip which has resilient properties, acts as the return spring and prevents the stem from escaping from the housing in which it slides. Finally, in order to ensure the sealing of these push-buttons, sealing gaskets are used. Unfortunately, over time, these sealing gaskets become dirty and hard, which causes sealing deficiencies which may be detrimental to the proper operation of the watch.

On the other hand, as mentioned hereinbefore, the push-buttons project from the middle part of the watch. They thus form protuberances which impair the aesthetic appearance of the watch.

Finally, these push-buttons, projecting from the middle part of the watch, may be handled inadvertently, for example by being caught on the wearer's shirt or jacket sleeve, which may cause a function of the watch to be inadvertently activated or the settings of the watch to be disturbed.

In order to overcome these drawbacks, correctors are already known. These are also buttons, but they are embedded in the middle part of the watch. Like push-buttons, they are used to adjust the different indications given by an electronic watch for example. These correctors can only be activated using a pointed element which enables them to be pushed. Aesthetically, correctors allow a middle part free of any protuberances to be achieved. However, their structure is as complicated as that of a push-button and they are thus expensive to make.

There is also known from GB Patent No. 2 077 506 in the name of Citizen, a watch case having push-buttons wherein stem and external push-button head are made in a single moulded plastic piece. The head has a wall which is thin enough to be slightly flexible, thus allowing the stem a small travel, and acting as a return spring. The free end of the stem bears a conductive rubber plate which, when the push-button is pushed in, is applied onto two fixed contacts to connect them electrically. The periphery of the flexible head is in the shape of a cylindrical skirt which, in a first embodiment of the push-button, is bonded in a sealed manner against the wall of the case. In another embodiment, the moulded part is made in a single piece with the case, the skirt being directly connected to the case.

Such a push-button head has to have a large enough diameter for the head to be flexible. This is possible in the case of the aforecited document because the push-buttons are located on an upper face of the case. Conversely, they could not be located on the lateral wall of the case (the part called the middle part), because the height is generally very limited. Further, repeated bending of the flexible plastic head is liable over time to cause the skirt to become unstuck or to split it, thereby affecting the sealing and operation of the push-button. It is also to be noted that the push-button head projects from the top surface of the case. It thus impairs the aesthetic appearance of the watch and may be activated inadvertently.

SUMMARY OF THE INVENTION

The main object of the present invention is thus to overcome the aforementioned drawbacks of the prior art in addition to others by proposing a push-button which can be made economically by a method for injecting plastic material such, that the push-button cannot be activated inadvertently.

The present invention therefore concerns a portable electronic device such as, in particular, a timepiece, including a case made of a plastic material and delimited by a back cover and a lateral wall called the middle part, characterised in that this electronic device includes at least one means intended, via the effect of an application of pressure, to control at least one electronic function such as a horological function of said electronic device, this means, directed towards the interior of the case, being integral with said case and being set back with respect to the outer surface of the case, said means being able to be activated using a pointed element such as the tip of a pen.

As a result of these features, the present invention provides a means or control member which can be made of the same plastic material as the case, which means it can be manufactured, for example by injection moulding or moulding, at the same time as said case. This results in substantial savings in terms of manufacturing costs. Moreover, as this control member is set back with respect to the outer surface of the case, the aesthetic appearance of the electronic device according to the invention such as, for example, a watch, is greatly improved. The control member is in fact completely embedded in the case, so that said case is free of any projecting part or protuberance. Finally, the control member can no longer be activated inadvertently. Thus there is no longer a risk of, for example, a chronograph being inadvertently started, which means that the battery or accumulator is not run down unnecessarily. Likewise, adjustments such as, for example, that of the current time or an alarm time, cannot be modified without the user's intervention.

According to another feature of the invention, the control means includes a stem connected to the case by a flexible portion which exerts a resilient return force on said stem.

The stem is of small dimensions, which allows it to be placed at any location on the case, for example on the middle part or in the back cover of said case. On the other hand, the flexible portion exerts a resilient return force on the stem via the effect of which said stem returns to its initial position, when the pressure exerted on it is released. It is thus no longer necessary to provide a return spring or a housing of a shape which is always complex in which said spring would housed. Due to its very simple construction, the control member according to the invention is thus inexpensive to manufacture.

Other features and advantages of the present invention will appear more clearly upon reading the following detailed description of an example embodiment of the portable object according to the invention, this example being given purely by way of non limiting illustration, in conjunction with the annexed drawings, in which:

The present invention proceeds from the general inventive idea which consists in providing a push-button made integral with the case of an electronic device, which is set back with respect to the outer surface of the case. As a result of these features, a case which has an improved aesthetic appearance and which is simple and thus inexpensive to manufacture, is obtained. Further, since the push-button is set back with respect to the outer surface of the case, there is no risk of the push-button being inadvertently activated and an electronic function being started when this is not desired.

The present invention will be described with reference to a timepiece of the wristwatch type. However, it goes without saying that the present invention could apply to any type of electronic device of relatively small dimensions such as, for example, a portable telephone, the electronic functions of which can be controlled by one or more push-buttons according to the invention.

Figure 1:
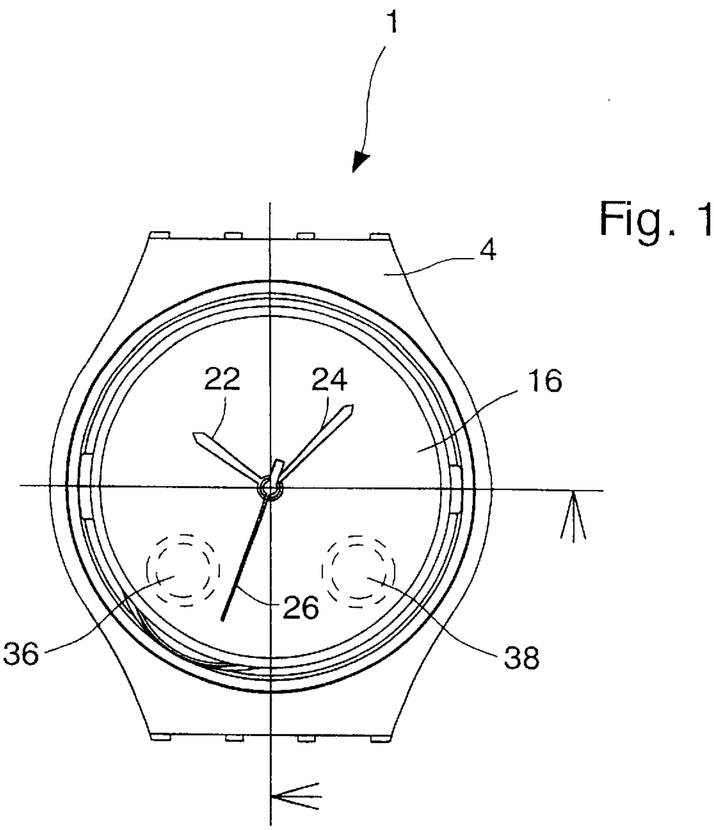
FIG. 1 is a top view of the watch forming the subject of the present invention.

The timepiece according to the invention may be, for example, a wristwatch. It is shown schematically in FIG. 1 and designated as a whole by the general reference numeral 1.

Timepiece 1 includes in a conventional manner a case 2 provided with a middle part 4 and a back cover 6 which delimit the bottom part of case 2. In the example shown, back cover 6 is made integral with middle part 4. It goes without saying however that the present invention applies in the same way to a case which is not of the monoshell type and which includes a back cover which is distinct from the middle part. Case 2 is made of a plastic material in accordance with well known techniques, for example injection moulding or moulding.

DETAILED DESCRIPTION OF THE INVENTION

Timepiece 1 also includes a watch movement 8 supplied with current by a battery or an electric accumulator 10 which may, if required, be recharged when run down. Battery 10, shown schematically in FIG. 2, typically has the shape of a button housed in back cover 6 of watch 1. One gains access to battery 10 via a removable cover 12 which is sealed by a sealing gasket 14. The top part of case 2 is delimited by a crystal 16 covering time information display means 18. In the example shown in FIG. 1, these display means 18 are formed of a dial 20 above which move an hour hand 22, a minute hand 24 and a second hand 26. They are thus analogue time display means. They could also be digital display means formed of a liquid crystal cell.

Finally, case 2 includes at its top periphery a notch 28 in which a bezel 30 is engaged to assure the securing of crystal 16 onto case 2. Bezel 30 is fixedly mounted on case 2, for example by bonding or ultrasound welding or by being driven thereon. Crystal 16 is sealed with respect to case 2 as a result of the use of a sealing gasket 32 wedged between the crystal and the case.

Figure 2:
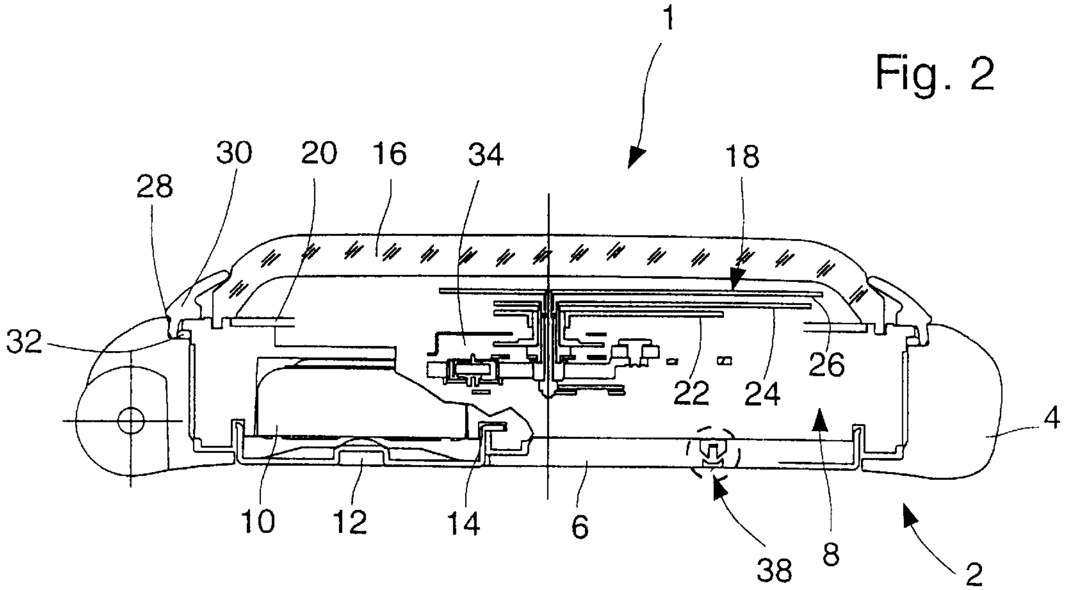
FIG. 2 is a cross-section along the 3 o'clock-6 o'clock axes of the watch of FIG. 1.

As can be seen in FIG. 2, middle part 4 of watch 1 defines a central cavity occupied by electronic watch movement 8. This watch movement 8, carried by a printed circuit (not shown) includes, amongst other things, a time base circuit, a frequency divider circuit powered by the time base, an electronic control module connected to the divider circuit and the display system 18 controlled by the electronic control module.

The electronic control module fulfills various functions. In particular, it maintains the oscillations of the quartz oscillator of the time base circuit, divides the quartz frequency, adjusts the working of the watch and operates a stepping motor able to drive a gear train 34 and the set of hands formed by hour hand 22, minute hand 24 and second hand 26 described hereinbefore. The control module also controls special functions such as the date, the chronograph, alarm, and the time zones, and allows certain indications to be adjusted and the time to be set.

Figure 3:
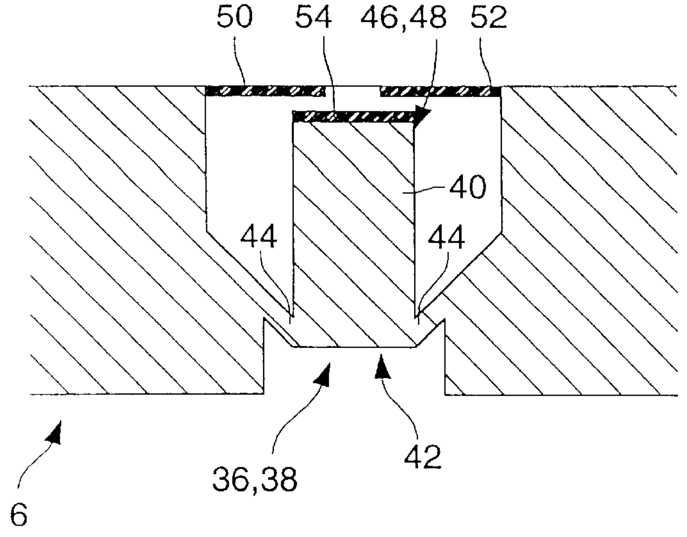
FIG. 3 is a larger scale view of the region surrounded with a circle in FIG. 2, the control means being idle.
Figure 4:
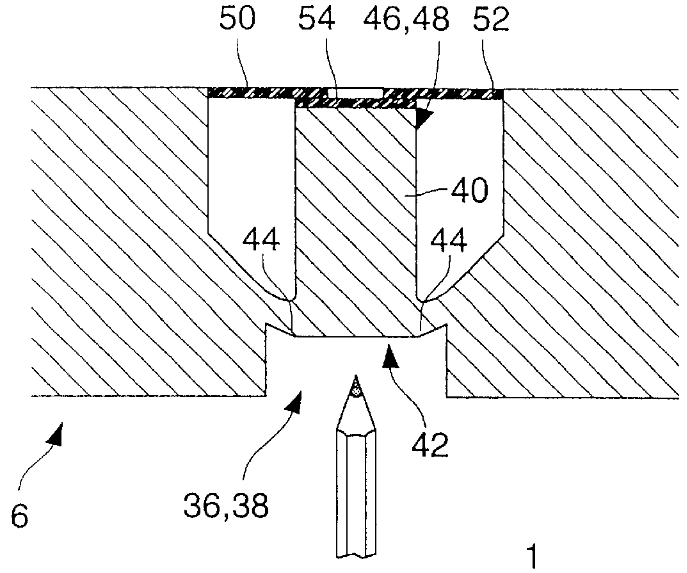
FIG. 4 is a similar view to that of FIG. 3, the control means being activated.
Figure 5:
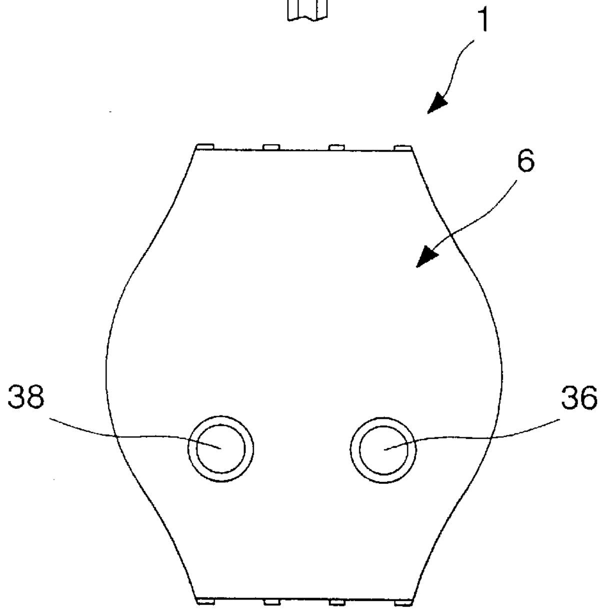
FIG. 5 is a bottom view of the watch shown in FIG. 1.

As shown more particularly in FIGS. 2 to 4, watch 1 includes, for example, two control members 36 and 38 according to the present invention each intended to control at least one time function of watch 1. By way of illustrative example only, an application of pressure on control member 36 allows the time of watch 1 to be set, and an application of pressure on control member 38 allows a chronograph to be started. More precisely, a short application of pressure on control member 36 causes the hands to move forward minute by minute, while a long application of pressure causes the hands to move forward by one hour. In a similar manner, a first application of pressure on control member 38 starts the chronograph, a second application of pressure allows the chronograph to be stopped and the elapsed interval of time to be measured, and a third application of pressure allows the chronograph to be reset to zero. It goes without saying that the number of control members carried by the watch is not limited to two, and is determined solely by the number of time functions which one wishes to control.

In the example shown in the Figures, control members 36 and 38 according to the invention are arranged in back cover

6 of case 2 of watch 1. Of course, because of their small dimensions, control members 36 and 38 may be placed at any location on watch 1, for example on middle part 4 or on bezel 30.

According to the present invention, control members 36 and 38 are identical and are each formed of a stem 40 preferably having a cylindrical, slightly conical or prismatic shape, oriented towards the interior of case 2 of watch 1. As is shown clearly in FIGS. 2 and 3, the end 42 of stems 40 located outside case 2 is set back with respect to the surface of back cover 6 of said case 2. Consequently, one obtains a case 2 free of any projecting parts or protuberances, which considerably improves the aesthetic appearance of watch 1. On the other hand, since control members 36 and 38 are completely embedded in case 2, the risk of them being inadvertently activated is non-existent. Thus, a time function is no longer liable to be activated inadvertently, which means that battery 10 is not run down unnecessarily. Likewise, the settings of watch 1 cannot be modified without the intervention of the user, who, with the aid of a pointed object such as the tip of a pen, can activate control members 36 and 38.

According to an essential feature of the invention, control members 36 and 38 are made in a single piece with case 2 of watch 1, which allows them to be manufactured, for example by injection moulding or moulding of a plastic material, at the same time as case 2. The manufacturing costs of such a case including two control members made in a single piece therewith are greatly reduced, as will be easily understood.

More precisely, stems 40 of control members 36 and 38 are connected to case 2 by a portion 44 which is thin enough to be slightly flexible and thus to allow a longitudinal travel for stems 40 and to act as a return spring for said stems 40. It will be noted that the return of stems 40 is assured solely by the resilience of the plastic material of which case 2 is made. Consequently, it is no longer necessary to provide a return spring or a housing to house such a spring, which, here again, means a substantial reduction in the manufacturing costs.

In the example of FIG. 3, portion 44 via which stem 40 is connected to case 2 has the shape of a circular skirt which opens towards the interior of case 2 at an angle which is selected so as to give said skirt 44 the proper resilience. Skirt 44 is directly connected to case 2 and completely surrounds stem 40, thus providing perfect sealing of control members 36 and 38 according to the invention. Thus one can omit the sealing gaskets which are usually used in conjunction with conventional push-buttons, it being known that such sealing gaskets have the drawback of becoming dirty and hard over time, which causes losses in sealing which may be detrimental to the proper working of watch 1.

On the internal side of case 2, end 46 of stem 40 has a frontal surface 48 which may have any shape appropriate to co-operate with electric contacts 50 and 52 which are connected, respectively to the positive pole of battery 10 and to an input of the electronic control module. For this purpose, frontal surface 48 may be metallised or accommodate a metal strip 54. Via the effect of a manual application of pressure on end 42 of stem 40 located outside case 2, the deformation of flexible skirt 44 causes stem 40 to travel to an active position shown in FIG. 4 in which it electrically connects the two contacts 50 and 52, which allows an instruction to be introduced into the electronic control module. When this application of pressure is released, stem 40 is returned to its idle position via the resilience of the plastic material.

The present invention is also very well suited to an flexible electronic device for elaborating and displaying data such as that disclosed in International Patent No. WO 99/67702 in the name of Viztec Inc. The portable device includes a flexible display cell and a flexible wristband which form the body of the device. The wristband allows the device to be secured around a person's wrist for example. The portable device includes light flexible parts which allow it to match the shape of a given contour and to have a flat profile. The device can thus bear the deformations to which a watch, for example, is subjected, during normal physical activity, without being damaged.

Such a device, because of its flexibility, is subjected to significant stress as well as to numerous contacts. If it is provided with conventional push-buttons which project from its outer surface, there is a large risk of these push-buttons being accidentally activated, which would cause the inadvertent activation of a watch function or the settings of the watch to be disturbed. This is why it is very advantageous to fit such a device with one or more control members according to the present invention. Embedded in the thickness of the flexible body, these control members do not impair the aesthetic appearance of the portable device and they cannot be activated inadvertently. Moreover, since they are made of the same plastic material as the flexible body, they can be manufactured at the same time as the latter. This results in substantial savings in terms of manufacturing costs.

The control members according to the invention may also be used in conjunctions with data input keys, for example capacitive or resistive keys. Indeed, a first solution, the simplest solution, would consist in leaving these data input keys constantly live, waiting for the wearer of the watch to use the buttons. In addition to the fact that these keys could then be inadvertently activated, simply by the contact of one of these keys with a finger of the user, this solution is uneconomical from the point of view of electric power consumption. A more advantageous solution would therefore consist in controlling the activation and deactivation of these data input keys by means of the control members according to the invention. A first application of pressure on one of the control members will make the corresponding data input key live. The user can then, by means of said data input key, correct or modify one of the data items processed and displayed by the portable device. A second application of pressure on the same control member will then deactivate the data input key.

It goes without saying that the invention is not limited to the embodiment which has just been described, and that simple modifications and variants may be envisaged without departing from the scope of the invention.

What is claimed is:

1. An electronic device including a case made of a plastic material delimited by a back cover and a lateral wall called a middle part, wherein said electronic device includes at least one control means intended, via the effect of an application of pressure, to control at least one electronic function of said electronic device, said control means, directed towards an interior of the case, being integral with said case and being set back with respect to an outer surface of said case, said control means being able to be activated using a pointed element, and said control means including a stem connected to the case by a flexible portion which exerts a resilient return force on said stem, and which is directly connected to the case and completely surrounds the stem, thus sealing said control means, wherein the flexible portion has a shape of a circular skirt, wherein said control means is a single-piece element made from the same said plastic material as the case by a single-shot injection molding process simultaneously with the case.

2. The electronic device according to claim 1, wherein the circular skirt opens towards the interior of the case.

3. The electronic device according to claim 1, wherein, on an inner side of the case, an end of the stem has a frontal surface which co-operates with electric contacts connected, respectively, to a positive pole of a battery and to an input of an electronic control module.

4. The electronic device according to claim 3, wherein the frontal surface of the stem can be metallised or accommodate a metal strip.

5. The electronic device according to claim 1, wherein the control means controls activation and deactivation of a data input key.

* * * * *